United States Patent
Kurahashi et al.

(10) Patent No.: US 9,067,171 B2
(45) Date of Patent: Jun. 30, 2015

(54) MEMBRANE FOR SEPARATING METHANE OR CARBON DIOXIDE, AND PRODUCTION THEREOF

(75) Inventors: Tomohiko Kurahashi, Osaka (JP); Masaji Ishino, Osaka (JP); Kouji Kuraoka, Kobe (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/114,027

(22) PCT Filed: Apr. 24, 2012

(86) PCT No.: PCT/JP2012/060945
§ 371 (c)(1),
(2), (4) Date: Oct. 25, 2013

(87) PCT Pub. No.: WO2012/147727
PCT Pub. Date: Nov. 1, 2012

(65) Prior Publication Data
US 2014/0050856 A1 Feb. 20, 2014

(30) Foreign Application Priority Data

Apr. 26, 2011 (JP) .................................. 2011-098292

(51) Int. Cl.
| | |
|---|---|
| *B01D 53/18* | (2006.01) |
| *B01D 53/22* | (2006.01) |
| *B01D 67/00* | (2006.01) |
| *B01D 71/02* | (2006.01) |

(52) U.S. Cl.
CPC ............. *B01D 53/18* (2013.01); *B01D 53/228* (2013.01); *B01D 67/0048* (2013.01);

(Continued)

(58) Field of Classification Search
None
See application file for complete search history.

(56) References Cited

U.S. PATENT DOCUMENTS 5,770,275 A * 6/1998 Raman et al. ................. 427/535
5,935,646 A * 8/1999 Raman et al. ................. 427/244

(Continued)

FOREIGN PATENT DOCUMENTS

| JP | 10-156157 A | 6/1998 |
| JP | 10-323547 A | 12/1998 |

(Continued)

OTHER PUBLICATIONS

De Vos et al, Journal of Membrane Science, 158, pp. 277-288, 1999.*

(Continued)

*Primary Examiner* — Erma Cameron
(74) *Attorney, Agent, or Firm* — Westerman, Hattori, Daniels & Adrian, LLP (57) ABSTRACT

The present invention discloses a process for producing a membrane for separating methane or carbon dioxide, having excellent heat resistance, durability and anti-chemical agent resistance (anti-corrosion resistance). The present invention is related to a process for producing a membrane for separating methane or carbon dioxide, which comprises the following steps:

(a) preparing a metal alkoxide solution by (i) mixing an acid catalyst, water and an organic solvent, (ii) adding thereto tetraalkoxysilane and mixing, and (iii) then adding thereto a hydrocarbon group-containing trialkoxysilane, of which a hydrocarbon group is selected from the group consisting of an alkyl group having 1 to 6 carbon atoms and a phenyl group, and mixing, (b) applying the metal alkoxide solution on an inorganic porous support, and then (c) calcining the inorganic porous support having metal alkoxide solution layer at a temperature of 30 to 300° C.

6 Claims, 4 Drawing Sheets

(52) U.S. Cl.
CPC ......... *B01D 71/028* (2013.01); *B01D 2256/24* (2013.01); *B01D 2257/504* (2013.01); *B01D 2257/7025* (2013.01); *Y02C 10/10* (2013.01); *Y02C 20/20* (2013.01); *B01D 2325/22* (2013.01); *B01D 2325/28* (2013.01); *B01D 2325/30* (2013.01)

(56) References Cited

U.S. PATENT DOCUMENTS

| | | | | |
|---|---|---|---|---|
| 6,797,206 | B1 * | 9/2004 | De Vos et al. | 264/45.1 |
| 2004/0038044 | A1 * | 2/2004 | Ruldolph et al. | 428/446 |
| 2009/0246114 | A1 * | 10/2009 | Sah et al. | 423/352 |

FOREIGN PATENT DOCUMENTS

| | | | |
|---|---|---|---|
| JP | 2000-093770 A | 4/2000 | |
| JP | 2001-269570 A | 10/2001 | |
| JP | 2004-533927 A | 11/2004 | |
| JP | 2005-074317 A | 3/2005 | |
| JP | 2005-162957 A | 6/2005 | |
| WO | 03/006141 A1 | 1/2003 | |

OTHER PUBLICATIONS

Elferink et al, Journal of Colloid and Interface Science, 180, pp. 127-134, 1996.*

International Search Report of PCT/JP2012/060945, mailing date of Jul. 24, 2012.

Raman, N. K. et al., "Organic 'template' approach to molecular sieving silica membranes", Journal of Membrane Science, 1995, vol. 105, pp. 273-279, Cited in ISR.

Extended European Search Report dated Feb. 20, 2015, issued in corresponding European Application No. 12777471.9. (6 pages).

* cited by examiner

MEMBRANE FOR SEPARATING METHANE OR CARBON DIOXIDE, AND PRODUCTION THEREOF

FIELD OF THE INVENTION

The present invention relates to a membrane for separating methane or carbon dioxide, particularly relates to a membrane for separating methane or carbon dioxide, having excellent heat resistance, durability and anti-chemical agent resistance (anti-corrosion resistance), and a process for producing the membrane.

BACKGROUND ART

Particular gas, especially methane gas, is separated or recovered from gas mixture, such as natural gas, naphtha, liquefied natural gas (LNG), liquefied petroleum gas (LPG) and off gas derived from petrochemical industry as well as gas mixture (sewage gas) generated by biochemically treating sludge from sewage treatment facilities or garbage disposal facilities and is effectively reused as fuel gas and the like. Materials which selectively separate and recover methane from the above-mentioned gas mixture include gas separating membranes or absorbents composed of organic or inorganic material (see Patents Documents 1-3).

Patent Document 1 (JP 10-156157 A) discloses an aromatic polyimide gas separating membrane which is produced by heating an aromatic polyimide membrane at a temperature of 350° C. or more to crosslink, the polyimide membrane being obtained by polymerizing and imidizing an aromatic tetracarboxylic acid and aromatic diamine (see claim 1 and paragraph [0002] of Patent Document 1). The resulting membrane is used for separating and recovering specific gas from natural gas and the like. The membrane of Patent Document 1 is poor in heat resistance, durability, chemical resistance (corrosion resistance), because the membrane is composed of organic material.

Patent Document 2 (JP 2001-269570 A) discloses an absorbent for digestion gas, which is formed from an activated charcoal having a specific surface area of 800 to 2,400 $m^2/g$, a pore volume of 0.4 to 1.5 $cm^3/g$ and a pore diameter of 7 to 20 Å (see claim 1, paragraphs [0001] to [0002] of Patent Document 2). The absorbent is used for effectively recovering/storing gas mixture (digestion gas) mainly containing methane, carbon dioxide or the like, which is generated by biochemically treating sludge from sewage treatment facilities or garbage disposal facilities. The absorbent of Patent Document 2 inevitably needs absorption and desorption steps and makes steps and facilities for separating or recovering specific gas complicated, because the material invented in Patent Document 2 is an absorbent.

Patent Document 3 (JP 2004-533927 A) discloses a gas permeation apparatus for separating purified methane from hydrocarbons higher than $C_1$ in a feed gas mixture such as natural gas, naphtha, liquefied natural gas (LNG), liquefied petroleum gas (LPG), off gas from petrochemical industries and others, which employ a selective permeable membrane which is formed from glassy and amorphous or semi-crystalline polymer and has a glass transition temperature above an operation temperature of a gas permeation apparatus, the selective permeable member being formed from aromatic polyimide, aromatic polyether and the like (see claims 1 to 2 and paragraph [0001] of Patent Document 3). According to Patent Document 3, the selective permeable membrane should have a glass transition temperature more than the operation temperature of the gas permeation apparatus of 10 to 100° C., preferably 40 to 60° C., at which temperature water vapor and higher hydrocarbon in the membrane are not condensed, in order to ensure permeation of gas with high credibility and to effectively perform the purification (see paragraphs [0005], [0007], [0020] and the like). In addition, the selective permeable membrane of Patent Document 3 is formed from organic material, same with Patent Document 1, and is poor in heat resistance, durability, chemical resistance (corrosion resistance).

As mentioned above, organic polymer materials for selective permeable membranes are not sufficient in heat resistance, while inorganic materials are poor in flexibility and are fragile. Patent Document 4 (JP 2005-162957 A) proposes inorganic-organic hybrid materials having high proton conductivity, which is obtained by solidifying, according to a sol-gel method, a raw material mixture of a silicon alkoxide having a methacryloxyalkyl group; at least one silicon alkoxide selected from the group consisting of a trifunctional silicon alkoxide and a tetrafunctional silicon alkoxide; at least one selected from the group consisting of ethylene glycol, polyethylene glycol, polyethylene glycol monomethacrylate, polyethylene glycol dimethacrylate, polyethylene glycol monoacrylate and polyethylene glycol diacrylate; and a phosphorus compound (see claim 1 of Patent Document 4). Patent Document 4 states that the hybrid material has excellent heat resistance and chemical resistance (corrosion resistance) and is employed in an elevated temperature of 100 to 150° C., because of the matrix phase being composed of inorganic material, and that the hybrid material shows excellent flexibility because of organic phase which is integrated with the inorganic matrix phase (see paragraphs [0036] to [0037] of Patent Document 4). The invention of Patent Document 4 is related to a self-standing film having high proton conductivity in a condition of low water content, which is composed of silicon alkoxide as inorganic matrix phase forming material, ethylene glycol and the like as organic phase forming material and phosphoric acid compound, and which is used as a proton-conductive member of organic fuel cell. Accordingly, Patent Document 4 does not suggest a process for producing a methane-selective membrane which is formed on an inorganic porous support.

CITATION LIST

Patent Literature

Patent Document 1: JP 10-156157 A
Patent Document 2: JP 2001-269570 A
Patent Document 3: JP 2004-533927 A
Patent Document 4: JP 2005-162957 A

SUMMARY OF THE INVENTION

Technical Problem

The object of the present invention is to solve the above mentioned problems and to provide a membrane for separating methane, having excellent heat resistance, durability and anti-chemical agent resistance (anti-corrosion resistance), and a process for producing the membrane. The present invention also provides a membrane for separating carbon dioxide, as the result of studying the production process of the methane-separating membrane.

Solution to Problem

The present inventors have intensely studied solutions for solving the above mentioned problems and have found that a membrane can be formed by thin film coating a metal alkoxide solution composed of tetraalkoxysilane and a hydrocarbon group-containing trialkoxysilane on an inorganic porous support, which shows affinity with methane because of presence of hydrocarbon group in the trialkoxysilane and preferentially permeates methane gas in comparison with other gases. The present invention has been completed based on the above finding. The present inventors have also invented a membrane which preferentially permeates carbon dioxide in comparison with other gases.

Accordingly, the present invention is related to a process for producing a membrane for separating methane or carbon dioxide, which comprises the following steps:

(a) preparing a metal alkoxide solution by (i) mixing an acid catalyst, water and an organic solvent, (ii) adding thereto tetraalkoxysilane and mixing, and (iii) then adding thereto a hydrocarbon group-containing trialkoxysilane, of which a hydrocarbon group is selected from the group consisting of an alkyl group having 1 to 6 carbon atoms and a phenyl group, and mixing, (b) applying the metal alkoxide solution on an inorganic porous support, and then (c) calcining the inorganic porous support having metal alkoxide solution layer at a temperature of 30 to 300° C.

In the process for producing the membrane, a membrane for separating methane is formed when the hydrocarbon group of the trialkoxysilane employed in the above step (a-iii) is selected from the group consisting of an alkyl group having 2 to 6 carbon atoms and a phenyl group, and a membrane for separating carbon dioxide is formed when the hydrocarbon group of the trialkoxysilane is methyl group.

In case of the membrane for separating methane, the present invention provides a process for producing a membrane for separating methane, which comprises the following steps:

(a) preparing a metal alkoxide solution by (i) mixing an acid catalyst, water and an organic solvent, (ii) adding thereto tetraalkoxysilane and mixing, and (iii) then adding thereto a hydrocarbon group-containing trialkoxysilane, of which a hydrocarbon group is selected from the group consisting of an alkyl group having 2 to 6 carbon atoms and a phenyl group, and mixing, (b) applying the metal alkoxide solution on an inorganic porous support, and then (c) calcining the inorganic porous support having metal alkoxide solution layer at a temperature of 30 to 300° C.

In case of the membrane for separating carbon dioxide, the present invention also provides a process for producing a membrane for separating carbon dioxide, which comprises the following steps:

(a) preparing a metal alkoxide solution by (i) mixing an acid catalyst, water and an organic solvent, (ii) then adding tetraalkoxysilane thereto and mixing, and (iii) adding thereto a methyltrialkoxysilane, and mixing, (b) applying the metal alkoxide solution on an inorganic porous support, and then (c) calcining the inorganic porous support having metal alkoxide solution layer at a temperature of 30 to 300° C.

In order to preferably conduct the present invention for the methane-separating membrane, the followings are preferred:

The acid catalyst is selected from the group consisting of nitric acid and hydrochloric acid, the organic solvent is selected from alcohols consisting of methanol, ethanol and propanol, the tetraalkoxysilane is selected from the group consisting of tetramethoxysilane and tetraethoxysilane, and the hydrocarbon group-containing trialkoxysilane is selected from the group consisting of ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, phenyltrimethoxysilane and phenyltriethoxysilane:

In the step (a), the step (a-i) is conducted at a temperature of 15 to 40° C. for 0.5 to 3 hours, the step (a-ii) is conducted at a temperature of 15 to 40° C. for 0.5 to 24 hours, the step (a-iii) is conducted at a temperature of 15 to 40° C. for 0.5 to 24 hours, the step (b) comprises (b-i) immersing the inorganic porous support in the metal alkoxide solution, (b-ii) drying by allowing it to stand at a temperature of 15 to 40° C. for 0.5 to 3 hours and (b-iii) repeating the steps (b-i) to (b-ii), the step (c) comprises (c-i) elevating temperature from room temperature to a calcining temperature of 30 to 300° C. for 1 to 24 hours, (c-ii) keeping at the calcining temperature for 0.5 to 6 hours, (c-iii) cooling from the calcining temperature to room temperature for 5 to 10 hours, and (c-iv) repeating the steps (b-i) to (c-iii) once to 10 times:

The metal alkoxide solution preferably contains 0.005 to 0.1 mol of the acid catalyst, 0.5 to 10 mol of water and 5 to 60 mol of the organic solvent, based on 1 mol of the combination of tetraalkoxysilane and the hydrocarbon group-containing trialkoxysilane, and a molar ratio of tetraalkoxysilane/hydrocarbon group-containing trialkoxysilane is 1/9 to 9/1:

The methane-separating membrane has a permeability ratio $[\alpha(CH_4/N_2)]$ of methane permeability $P(CH_4)$/nitrogen permeability $P(N_2)$ of 1 to 10 and a permeability ratio $[\alpha(CO_2/N_2)]$ of carbon dioxide permeability $P(CO_2)$/nitrogen permeability $P(N_2)$ of 1 to 100.

The present invention also provides a membrane for separating methane which is obtainable by applying, on an inorganic porous support, a metal alkoxide solution comprising a tetraalkoxysilane, acid catalyst water, an organic solvent and a hydrocarbon group-containing trialkoxysilane, of which a hydrocarbon group is selected from the group consisting of an alkyl group having 2 to 6 carbon atoms and a phenyl group to form a metal alkoxide coating, followed by calcining the metal alkoxide coating.

Further, another embodiment of the present invention is a membrane for separating methane, which is produced by a process which comprises the following steps:

(a) preparing a metal alkoxide solution by (i) mixing an acid catalyst, water and an organic solvent, (ii) adding thereto tetraalkoxysilane and mixing, and (iii) then adding thereto a hydrocarbon group-containing trialkoxysilane, of which a hydrocarbon group is selected from the group consisting of an alkyl group having 2 to 6 carbon atoms and a phenyl group, and mixing, (b) applying the metal alkoxide solution on an inorganic porous support, and then (c) calcining the inorganic porous support having metal alkoxide solution layer at a temperature of 30 to 300° C.

In case of a membrane for separating carbon dioxide, the hydrocarbon group of the hydrocarbon group-containing trialkoxysilane is changed to a hydrocarbon group having one carbon atoms (i.e. methyl group) to obtain it.

For the carbon dioxide-separating membrane, it is preferred that the acid catalyst is selected from the group consisting of nitric acid and hydrochloric acid, the organic solvent is selected from alcohols consisting of methanol, ethanol and propanol, the tetraalkoxysilane is selected from the group consisting of tetramethoxysilane and tetraethoxysilane, and the methyltrialkoxysilane is selected from the group consisting of methyltrimethoxysilane and methyltriethoxysilane.

For the carbon dioxide-separating membrane, it is preferred that the step (a-i) is conducted at a temperature of 15 to 40° C. for 0.5 to 3 hours, the step (a-ii) is conducted at a temperature of 15 to 40° C. for 0.5 to 24 hours, the step (a-iii) is conducted at a temperature of 15 to 40° C. for 0.5 to 24 hours, the step (b) comprises (b-i) immersing the inorganic porous support in the metal alkoxide solution, (b-ii) drying by allowing it to stand at a temperature of 15 to 40° C. for 0.5 to 3 hours and (b-iii) repeating the steps (b-i) to (b-ii), the step (c) comprises (c-i) elevating temperature from room temperature to a calcining temperature of 30 to 300° C. for 1 to 24 hours, (c-ii) keeping at the calcining temperature for 0.5 to 6 hours, (c-iii) cooling from the calcining temperature to room temperature for 5 to 10 hours, and (c-iv) repeating the steps (b-i) to (c-iii) once to 10 times.

For the carbon dioxide-separating membrane, it is also preferred that the metal alkoxide solution contains 0.005 to 0.1 mol of the acid catalyst, 0.5 to 10 mol of water and 5 to 60 mol of the organic solvent, based on 1 mol of the combination of tetraalkoxysilane and methyltrialkoxysilane, and a molar ratio of tetraalkoxysilane/methyltrialkoxysilane is 1/9 to 9/1.

For the carbon dioxide-separating membrane, it is further preferred that the carbon dioxide-separating membrane has a permeability ratio $[\alpha(CH_4/N_2)]$ of methane permeability $P(CH_4)$/nitrogen permeability $P(N_2)$ of 1 to 10 and a permeability ratio $[\alpha(CO_2/N_2)]$ of carbon dioxide permeability $P(CO_2)$/nitrogen permeability $P(N_2)$ of 1 to 100.

For the carbon dioxide-separating membrane, it is also preferred that the permeation ratio $[\alpha(CO_2/N_2)]$ of carbon dioxide permeability $P(CO_2)$/nitrogen permeability $P(N_2)$ is maximum when a molar ratio of tetraalkoxysilane/methyltrialkoxysilane is 7/3 to 3/7.

Technical Effects of Invention

According to the present invention, the tetraalkoxysilane is firstly polymerized and the hydrocarbon group-containing trialkoxysilane is added thereto to form a metal alkoxide solution, and the metal alkoxide solution is thin-film applied on an inorganic porous support, followed by calcining. The resulting inorganic coating shows excellent heat resistance, durability and chemical resistance (corrosion resistance).

DETAILED DESCRIPTION OF THE EMBODIMENTS

The separation membrane of the present invention is characterized by a producing process which comprises applying, on an inorganic porous support, a metal alkoxide solution comprising a tetraalkoxysilane, acid catalyst water, an organic solvent and a hydrocarbon group-containing trialkoxysilane, of which a hydrocarbon group is selected from the group consisting of an alkyl group having 1 to 6 carbon atoms and a phenyl group, to form a metal alkoxide coating, followed by calcining the metal alkoxide coating.

The process for producing the membrane for separating methane or carbon dioxide comprises the following steps:

(a) preparing a metal alkoxide solution by (i) mixing an acid catalyst, water and an organic solvent, (ii) adding thereto tetraalkoxysilane and mixing, and (iii) then adding thereto a hydrocarbon group-containing trialkoxysilane, of which a hydrocarbon group is selected from the group consisting of an alkyl group having 1 to 6 carbon atoms and a phenyl group, and mixing, (b) applying the metal alkoxide solution on an inorganic porous support, and then (c) calcining the inorganic porous support having metal alkoxide solution layer at a temperature of 30 to 300° C.

The "tetraalkoxysilane" used in the present specification is a compound having a chemical formula:

(wherein $R_1$ to $R_4$, same or different, indicate an alkyl group having 1 to 3 carbon atoms.)

Examples of the tetraalkoxysilanes are selected from the group consisting tetramethoxysilane and tetraethoxysilane.

The "hydrocarbon group-containing trialkoxysilane" in the present specification is a compound having a chemical formula:

(wherein $R_5$ indicates a hydrocarbon group selected from the group consisting of an alkyl group having 1 to 10 carbon atoms and a phenyl group, and $R_6$ to $R_8$, same of different, indicate an alkyl group having 1 to 2 carbon atoms.)

Examples of the hydrocarbon group-containing trialkoxysilanes are selected from the group consisting of methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, octyltrimethoxysilane, octyltriethoxysilane, decyltrimethoxysilane, decyltriethoxysilane, phenyltrimethoxysilane and phenyltriethoxysilane.

The hydrocarbon group-containing trialkoxysilane for the methane separation membrane is selected from the group consisting of an alkyl group having 2 to 6 carbon atoms and a phenyl group. The resulting methane separation membrane shows excellent methane separation ability. Examples of the trialkoxysilanes are selected from the group consisting of ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, octyltrimethoxysilane, octyltriethoxysilane, decyltrimethoxysilane, decyltriethoxysilane, phenyltrimethoxysilane and phenyltriethoxysilane.

The hydrocarbon group-containing trialkoxysilane for the carbon dioxide separation membrane is a methyl group-containing trialkoxysilane, such as methyltrimethoxysilane and methyltriethoxysilane.

In the step (a) for preparing a metal alkoxide solution, an acid catalyst, water and an organic solvent are mixed as step (a-i). The acid catalyst is selected from the group consisting of nitric acid and chloric acid. The organic solvent can be an alcohol selected from the group consisting of methanol, ethanol and propanol.

An amount of acid catalyst can be 0.005 to 0.1 mol based on one mol of a total of tetraalkoxysilane and hydrocarbon group-containing trialkoxysilane. An amount of water can be 0.5 to 10 mol based on one mol of a total of tetraalkoxysilane and hydrocarbon group-containing trialkoxysilane. An amount of organic solvent can be 5 to 60 mol based on one mol of a total of tetraalkoxysilane and hydrocarbon group-containing trialkoxysilane. If an amount of acid catalyst is less than 0.005 mol, a rate of hydrolysis would reduce to extend production time. If it is more than 0.1 mol, a rate of hydrolysis would be too fast to obtain a uniform separation membrane. If an amount of water is less than 0.5 mol, a rate of hydrolysis would be low and hydrolysis would not be enough. If it is more than 10 mol, hydrolysis would proceed too much and it is difficult to form membrane, thus increasing pore size. If an amount of organic solvent is less than 5 mol, a concentration of the metal alkoxide solution would be high and does not form uniform and fine membrane. If it is more than 60 mol, a concentration of the metal alkoxide solution would be lowered and a coating amount with one coating operation would be also lowered and number of coating operation would be increased.

In addition, the step (a-i) is generally conducted at a temperature of 15 to 40° C. for 0.5 to 3 hours, preferably 1 to 2 hours. If the mixing time is less than 0.5 hours, mixing would be insufficient. Mixing for 3 hours is sufficient and even if mixing time is extended, no effects would be obtained and production time would only be prolonged.

In the step (a-ii), tetraalkoxysilane is added to the solution obtained in the step (a-i) and then mixed. The tetraalkoxysilane is selected from the group of tetramethoxysilane and tetraethoxysilane. The step (a-ii) is generally conducted at a temperature of 15 to 40° C. for 0.5 to 24 hours, preferably 0.5 to 6 hours. Mixing time of less than 0.5 hours or mixing temperature of less than 15° C. reduces polymerization degree of tetraalkoxysilane. Mixing time of more than 24 hours or mixing temperature of more than 40° C. proceeds polymerization of tetraalkoxysilane too much and does not uniformly disperse the hydrocarbon group by the addition of the hydrocarbon group-containing tetraalkoxysilane.

In the step (a-iii), the hydrocarbon group-containing trialkoxysilane is added thereto and mixed by stirring. In case where a methane separation membrane is produced, the hydrocarbon group of the hydrocarbon group-containing trialkoxysilane is a hydrocarbon group having 2 to 6 carbon atoms and a phenyl group. Examples of the hydrocarbon group-containing trialkoxysilanes are ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxysilane, phenyltrimethoxysilane and phenyltriethoxysilane. In case where a carbon dioxide separation membrane is produced, the hydrocarbon group-containing trialkoxysilane is a trialkoxysilane having a methyl group, including methyltrimethoxysilane and methyltriethoxysilane. The hydrocarbon group-containing trialkoxysilane can be produced by substituting one of a methoxy group or an ethoxy group of the tetraalkoxysilane with the hydrocarbon group having 1 to 6 carbon atoms (such as methyl group, ethyl group, propyl group, butyl group, pentyl group, hexyl group) or phenyl group.

A molar ratio of tetraalkoxysilane/hydrocarbon group-containing trialkoxysilane can preferably be 9/1 to 1/9. If an amount of tetraalkoxysilane is less than 10 mol % based on the total amount of tetraalkoxysilane and hydrocarbon group-containing trialkoxysilane, the hydrocarbon group-containing trialkoxysilane is concentrated too much and uniform dispersion of the hydrocarbon group is not obtained. If it is more than 90 mol %, the hydrocarbon group-containing trialkoxysilane is contained very little and the hydrocarbon group is also contained very little to deteriorate affinity for methane.

The molar ratio of tetraalkoxysilane/hydrocarbon group-containing trialkoxysilane shows good performance within the above mentioned range, but the performance is a little different in relation to affinity for gases. When preparing a methane separation membrane, the more the hydrocarbon group-containing trialkoxysilane based on the amount of tetraalkoxysilane increase, the more the permeability ratio $[\alpha(CH_4/N_2)]$ of methane permeability $P(CH_4)$/nitrogen permeability $P(N_2)$ increase. Accordingly, the molar ratio of tetraalkoxysilane/hydrocarbon group-containing trialkoxysilane is preferable within the range of 7/3 to 1/9, more preferably 5/5 to 1/9, for the methane separation membrane. Regarding a carbon dioxide separation membrane, the behavior is different. When the molar ratio of tetraalkoxysilane/hydrocarbon group-containing trialkoxysilane (i.e. methyltrialkoxysilane) is within the range of 7/3 to 3/7, preferably 6/4 to 4/6, a permeation ratio $[\alpha(CO_2/N_2)]$ of carbon dioxide permeability $P(CO_2)$/nitrogen permeability $P(N_2)$ shows maximum values. In relation to the carbon dioxide separation membrane, a permeation ratio $[\alpha(CO_2/CH_4)]$ of carbon dioxide permeability $P(CO_2)$/methane permeability $P(CH_4)$ shows maximum values when the a molar ratio of tetraalkoxysilane/methyltrialkoxysilane is within the range of 8/2 to 3/7, preferably 7/3 to 5/5. These behaviors are very specific and can be suitably employed. These behaviors are ascertained in Examples of the present invention.

The step (a-iii) is preferably conducted at a temperature of 15 to 40° C. for 0.5 to 24 hours, preferably 0.5 to 6 hours. Temperatures of less than 15° C. or times of less than 0.5 hours deteriorate hydrolysis of the hydrocarbon group-containing trialkoxysilane and times of more than 24 hours do not enhance anything and merely extend production time.

In the process for producing the separation membrane of the present invention, the acid catalyst, water and the organic solvent are mixed in the step (a-i) and then the tetraalkoxysilane is added thereto in the step (a-ii), in which it is mixing at a predetermined temperature for a predetermined period of time. In the step (a-ii), the reaction proceeds as the following reaction scheme, in which tetraalkoxysilanes are hydrolyzed to form tetrahydroxysilanes which are then polymerized to form a polysiloxane oligomer having three-dimensionally crosslinked polysiloxane bone, of which some of hydroxyl groups remain without polymerization. In the following reaction formula, tetraethoxysilane is used as tetraalkoxysilane and tetraethoxysilane of which one ethoxy group is changed to a hydrocarbon group R is used as hydrocarbon group-containing trialkoxysilane, in order to simplify. The following reaction is illustratively shown to simply and easily explain the reaction and is not construed as the following reaction actually occurring.

In step (a-ii):

-continued

In the above step (a-ii), the reaction of tetrahydrosilane should be controlled as three dimensional polymerizations do not completely proceed and some of hydroxyl groups (or ethoxy group (—$OC_2H_5$)) remain without reaction. In the next step (a-iii), hydrocarbon group-containing trialkoxysilane is added thereto to react with the polysiloxane oligomer (i.e. not completely polymerized siloxane) by dealcoholization as shown in the following reaction scheme, by which the hydrocarbon groups R are uniformly dispersed in the three dimensionally crosslinked polysiloxane network. As shown in the following reaction scheme, the partially polymerized siloxane network (which may be called "polysiloxane network oligomer") is bonded with each other via hydrocarbon group-containing trialkoxysilane to form crosslinked polysiloxane network in which the hydrocarbon groups R are uniformly dispersed.

In step (a-iii):

In the process for producing the separation membrane of the present invention, the hydrocarbon group R should be dispersed uniformly in the polysiloxane network as far as possible. For uniformly dispersing hydrocarbon groups R, tetraalkoxysilane is preliminary polymerized by hydrolysis and then hydrocarbon group-containing trialkoxysilane is added thereto to form the metal alkoxide solution containing hydrocarbon groups R uniformly dispersed in polysiloxane network, which is different from conventional process in which tetraalkoxysilane and hydrocarbon group-containing trialkoxysilane are simultaneously added to react with water.

The uniform dispersion of the hydrocarbon groups R of the above mentioned hydrocarbon group-containing trialkoxysilane in the separation membrane would create affinity between methane and the hydrocarbon group R and make it possible to pass methane through the membrane preferentially. The uniform dispersion of the hydrocarbon group R throughout the separation membrane would fulfill the affinity with the hydrocarbon group R even if gas molecules in a level of angstrom are passed through wherever in the separation membrane. In case of a carbon dioxide separation membrane, the methyl group of the methyl group-containing trialkoxysilane shows high affinity with carbon dioxide and a separation of carbon dioxide can be effectively conducted.

In the step (b) of the process for producing the separation membrane of the present invention, the metal alkoxide solution as obtained above is applied on an inorganic porous support. The application method is not limited and may include dipping, spraying, spin-coating and the like. Dipping method is preferred, because of easy control of production conditions for obtaining the methane separation membrane of the present invention with simple production apparatus.

The inorganic porous support mentioned above may include silica ceramics, silica glass, alumina ceramics, porous stainless material, porous titanium material, porous silver material and the like. Its shape is also not limited and changed according to its application, but cylindrical shape and flat plate are suitably used.

In case where the application method is dipping method, the step (b) may include (b-i) dipping the inorganic porous substrate in a metal alkoxide solution, (b-ii) drying by allowing it to stand at a temperature of 15 to 40° C. for 0.5 to 3.0 hours and (b-iii) repeating the steps (b-i) and (b-ii). The step (b) is preferably conducted at a pulling speed of 0.1 to 2.0 mm/sec. Pulling speeds of less than 0.1 mm/sec would prolong processing time of dipping step and those of more than 2.0 mm/sec would increase a thickness of coated film. Drying times of less than 0.5 hours do not dry sufficiently. 3.0 hours of drying time are sufficient and drying times of more than 3.0 hours are possible but are not necessary. Noted that the repeating of the steps (b-i) and (b-ii) in the step (b-iii) is necessary for uniformly coating the metal alkoxide solution on the inorganic porous support.

The step (c) may include (c-i) elevating temperature from room temperature to a calcining temperature of 30 to 300° C. for 1 to 24 hours, (c-ii) keeping at the calcining temperature for 0.5 to 6 hours, (c-iii) cooling from the calcining temperature to room temperature for 5 to 10 hours and (c-iv) repeating the steps (b-i) to (c-iii) once to ten times.

In the step (c-i), the calcining temperature can be 30 to 300° C., preferably 50 to 200° C. Calcining temperatures of less than 30° C. would not provide sufficient calcining and those of more than 300° C. would deteriorate the resulting membrane due to heat. Elevating times of less than 1 hour would not form uniform membrane thickness by rapid temperature changes and those of more than 24 hours might deteriorate the resulting membrane by exposing to high temperature for long time.

In the step (c-ii), the keeping times of less than 0.5 hours would not provide sufficient calcining and those of more than 6 hours would deteriorate the membrane by heat.

In the step (c-iii), the cooling time of the calcining temperature to room temperature would make cracks and fractures and those of more than 10 hours would deteriorate the resulting membrane.

In the producing method of the separation membrane of the present application, the step (c-iv) includes repeating the steps (b-i) to (c-iii) one to ten time, preferably 3 to 7 times until the membrane does not have cracks and a pore size near gas molecular size, and a permeability ratio $[\alpha(CH_4/N_2)]$ of methane permeability $P(CH_4)$/nitrogen permeability $P(N_2)$ is 1 to 10.

The inorganic porous substrate employed in the process for producing the separation membrane of the present invention preferably has a lot of pores which have a pore size of 0.01 to 100 μm and forms a separating layer having a pore size equal to or near a molecular size of gas to be separated, such as methane and carbon dioxide. The separation membrane obtained by the production process of the present invention has a pore size equal to or near gas molecular sizes of methane or carbon dioxide and has the hydrocarbon group R in the hydrocarbon group-containing trialkoxysilane which shows affinity with gas molecules and passes the gas molecules, i.e. methane or carbon dioxide through preferentially.

The metal alkoxide solution may be directly coated on a surface of the inorganic porous substrate. In case where the inorganic porous substrate has pores having such a large size that the metal alkoxide solution is poured into the pores and therefore it is very difficult to form a coating on the surface of the substrate, an intermediate layer is formed on a surface of the inorganic porous substrate and then the metal alkoxide solution is coated thereon. The intermediate layer formed on the inorganic porous substrate would have more narrow pores on the inorganic porous substrate and can improve coating environment of the metal alkoxide solution. The intermediate layer may preferably contain inorganic particles, such as α-alumina, γ-alumina, silica and silicalite. The intermediate layer can also be formed by art-known application method, such as dipping method and the like.

A molecular size of methane $(CH_4)$ is 3.8 Å (0.38 nm), a molecular size of carbon dioxide $(CO_2)$ is 3.3 Å and that of nitrogen $(N_2)$ is 3.64 Å. It is very difficult to actually determine a pore size of the separation membrane of the present invention because the pores are very small and actually have very complicated shape. However, a determination of permeability of a specific gas, such as methane, is considered to be a separation ability of the membrane. For example, the separation membrane of the present invention can be evaluated by a permeability ratio $[\alpha(CH_4/N_2)]$ of a methane permeability $P(CH_4)$ and a nitrogen gas permeability $P(N_2)$, or a permeability ratio $[\alpha(CO_2/N_2)]$ of a carbon dioxide permeability $P(CO_2)$ and a nitrogen gas permeability $P(N_2)$, because nitrogen gas does not have affinity with the hydrocarbon group of the hydrocarbon group-containing trialkoxysilane and does not pass through the membrane so much. As mentioned above, the molecular size of methane gas is larger than that of nitrogen gas and the permeability ratio $[\alpha(CH_4/N_2)]$ should be less than 1. However, the permeability ratio $[\alpha(CH_4/N_2)]$ is actually more than 1 and therefore methane gas which is larger than nitrogen gas in molecular size can be preferentially passed through the separation membrane of the present invention, because the hydrocarbon group R of the hydrocarbon group-containing trialkoxysilane is uniformly dispersed throughout the methane separation membrane of the present invention and shows affinity with methane gas.

The separation membrane of the present invention preferably has a permeation ratio $[\alpha(CH_4/N_2)]$ (a ratio of methane permeability $P(CH_4)$ and nitrogen permeability $P(N_2)$) of 1 to 10, more preferably 1 to 5, and has a permeation ratio $[\alpha(CO_2/N_2)]$ (a ratio of carbon dioxide permeability $P(CO_2)$ and nitrogen permeability $P(N_2)$) of 1 to 100, more preferably 1 to 70. If the permeation ratio $[\alpha(CH_4/N_2)]$ is less than 1, methane gas is not separated sufficiently and if the permeability ratio $[\alpha(CO_2/N_2)]$ is less than 1, carbon dioxide gas is not separated sufficiently.

A gas permeation test can be conducted by the following method. A separation membrane is dried at a reduced pressure for one hour to remove water in the membrane and then put in a closed space. In the closed space, each gas of nitrogen gas $(N_2)$, methane gas $(CH_4)$ and carbon dioxide gas $(CO_2)$ is solely passed through the separation membrane at a pressure of 0.1 MPa and room temperature and a flow amount (mL/min) of gas passed through is determined by a mass flow meter to obtain a gas permeability $[mol/(m^2 \cdot s \cdot Pa)]$ as a volume (molar number) of gas passed through the test membrane having a unit area for a unit time at a unit partial pressure.

EXAMPLES

The present invention is explained in detail by the following Examples which are, however, not construed to their detail.

Example 1

(a) Preparation of a Metal Alkoxide Solution (i) Nitric acid, water and ethanol in ingredients of metal alkoxide solution shown in Table 1 were put in a container and mixed using a magnetic stirrer at room temperature for 30 minutes to obtain a mixture solution.

(ii) Tetraethoxysilane in the ingredients of metal alkoxide solution was added to the mixture obtained in the step (i) and mixed for another one hour.

(iii) Then, ethyltriethoxysilane in the ingredients was added and mixed for another 2.5 hours to obtain a metal alkoxide solution.

(b) Application of the Metal Alkoxide Solution

An alumina tube (inside diameter 7 mm, outside diameter 10 mm and length 50 mm) as an inorganic porous substrate was dip-coated in the metal alkoxide solution obtained above at a pulling speed of 1 mm/sec, and then dried at room temperature for one hour. Dip coating and drying were conducted further.

(c) Calcining Step

The inorganic porous substrate on which the metal alkoxide solution was coated and dried was put in a calcining apparatus and heated from 25° C. (room temperature) to 150° C. for one hour for 5 hours. At the temperature, it was kept for 2 hours and then cooled from 150° C. to 25° C. for 5 hours.

(d) Application and Calcining Steps

The steps (b) and (c) were repeated three times to obtain a separation membrane.

Example 2

A separation membrane was prepared as generally described in Example 1, with the exception that propyltriethoxysilane was employed instead of ethyltriethoxysilane, a formulation ratio was changed and the steps (b) and (c) were repeated 5 times although the repetition number was total 4 times in Example 1.

Example 3

A separation membrane was prepared as generally described in Example 2, with the exception that a formulation amount of tetraethoxysilane and propyltriethoxysilane was changed.

Example 4

A separation membrane was prepared as generally described in Example 2, with the exception that hexyltriethoxysilane was employed instead of propyltriethoxysilane.

Example 5

A separation membrane was prepared as generally described in Example 2, with the exception that phenyltriethoxysilane was employed instead of propyltriethoxysilane.

Example 6

A separation membrane was prepared as generally described in Example 1, with the exception that methyltriethoxysilane was employed instead of ethyltriethoxisilane, a formulation amount was changed and the steps (b) and (c) were repeated 3 times although the repetition number was total 4 times in Example 1.

Example 7

A separation membrane was prepared as generally described in Example 1, with the exception that methyltriethoxysilane was employed instead of ethyltriethoxisilane, and a formulation amount was changed as shown in Table 1.

TABLE 1

| Ingredients of metal alkoxide solution | Examples | | | | |
|---|---|---|---|---|---|
| | 1 | 2 | 3 | 4 | 5 |
| Tetraethoxysilane*1 | 0.5 | 0.7 | 0.5 | 0.7 | 0.7 |
| Ethyltriethoxysilane*2 | 0.5 | — | — | — | — |
| Propyltriethoxysilane*3 | — | 0.3 | 0.5 | — | — |
| Hexyltriethoxysilane*4 | — | — | — | 0.3 | — |
| Phenyltriethoxysilane*5 | — | — | — | — | 0.3 |
| Methyltriethoxysilane*6 | — | — | — | — | — |
| Water | 2 | 2 | 2 | 2 | 2 |
| Nitric acid*7 | 0.01 | 0.01 | 0.01 | 0.01 | 0.01 |
| Ethanol*8 | 20 | 20 | 20 | 20 | 20 |
| Number of repetition | 4 | 5 | 5 | 5 | 5 |

All numbers except example number and repetition number are expressed in molar amount.

TABLE 2

| Ingredients of metal alkoxide solution | Examples | |
|---|---|---|
| | 6 | 7 |
| Tetraethoxysilane*1 | 0.9 | 0.7 |
| Ethyltriethoxysilane*2 | — | — |
| Propyltriethoxysilane*3 | — | — |
| Hexyltriethoxysilane*4 | — | — |
| Phenyltriethoxysilane*5 | — | — |
| Methyltriethoxysilane*6 | 0.1 | 0.3 |
| Water | 2 | 2 |
| Nitric acid*7 | 0.01 | 0.01 |
| Ethanol*8 | 20 | 20 |
| Number of repetition | 3 | 4 |

All numbers except example number and repetition number are expressed in molar amount.
*1Tetraethoxysilane available from Sin-Etsu Chemical Co., Ltd. as "LS-2430"
*2Ethyltriethoxysilane available from Sin-Etsu Chemical Co., Ltd. as "LS-2410"
*3Propyltriethoxysilane available from Sin-Etsu Chemical Co., Ltd. as "LS-3120"
*4Hexyltriethoxysilane available from Sin-Etsu Chemical Co., Ltd. as "LS-4808"
*5Phenyltriethoxysilane available from Sin-Etsu Chemical Co., Ltd. as "LS-4480"
*6Methyltriethoxysilane available from Sin-Etsu Chemical Co., Ltd. as "LS-1890"
*7Nitric acid (69.5%), special grade chemical, available from Wako Pure Chemical Industries, Co., Ltd.
*8Ethanol (99.5%), special grade chemical, available from Wako Pure Chemical Industries, Co., Ltd.

Gas permeability was determined for every separation membranes in Examples 1 to 7. The results of the determination are shown in Tables 3 and 4, together with permeation ratio α which is a ratio in comparison with nitrogen gas permeability $P(N_2)$. Method for the determination is as follow.

(Determination of Gas Permeability)

Figure 1:
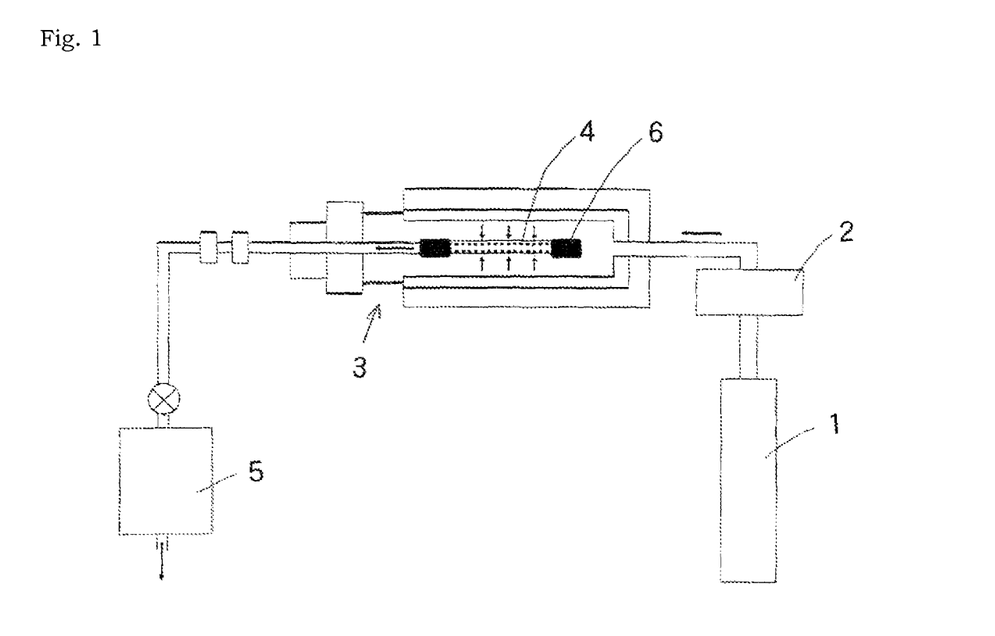
FIG. 1 is a schematic view explaining a method of determining gas permeability in Examples.

A separation membrane was dried at a reduced pressure for one hour to remove water in the membrane and then put in a closed space. In the closed space, each gas of nitrogen gas ($N_2$), methane gas ($CH_4$) and carbon dioxide gas ($CO_2$) was solely passed through the separation membrane at a pressure of 0.1 MPa and room temperature and a flow amount (mL/min) of gas passed through was determined by a mass flow meter to obtain a gas permeability [$mol/(m^2 \cdot s \cdot Pa)$] as a volume (molar number) of gas passed through the test membrane having a unit area for a unit time at a unit partial pressure. Concretely, as shown in FIG. 1, a gas pressure of a gas cylinder bottle (1) were adjusted by a pressure gage (2) to a supply gas pressure 0.1 MPa at room temperature and a gas permeation test apparatus (3) was filled with the gas. A flow amount (mL/min) of the gas which was passed through a separation membrane (4) was determined by a mass flow meter (5). The flow amount was calculated to a gas permeability [$mol/(m^2 \cdot s \cdot Pa)$].

The separation membrane was fitted with the gas permeation test apparatus by adhering the separation membrane to a heat resistant glass tube (Pyrex available from Corning Co.; outside diameter of 8 mm, inside diameter of 6 mm and length of 10 mm, one end of the tube was tapered to a diameter of 1 to 3 mm so that it would be inserted into the insider of an alumina tube forming the separation membrane) using an adhesive agent (Cemedine® available from Cemedine Co., Ltd.), followed by sealing a connection portion and an upper portion of the membrane with an epoxy resin sealing agent (6) (a two-liquids epoxy type adhesive agent "AV138" or "HV998" available from Nagase Chemtex Corporation). The mass flow meter was a thermal type mass flow meter (Mass Flow Meter 5410 available from Kofloc (Kojima Instruments Inc.), having a flow range: 10 mL/min and a full scale accuracy to maximum flow: ±1% (20° C.).

TABLE 3

| Test items | Examples | | | | |
|---|---|---|---|---|---|
| | 1 | 2 | 3 | 4 | 5 |
| Permeability P [$10^{-10}$ mol/(m² · s · Pa)] | | | | | |
| P($N_2$) | 2.3 | 0.84 | 5.75 | 5.37 | 2.15 |
| P($CH_4$) | 6.44 | 2.36 | 17.4 | 16.6 | 4.76 |
| P($CO_2$) | 45.9 | 30.0 | 81.4 | 520. | 38.5 |
| Separating ratio α | | | | | |
| α($CH_4/N_2$) | .8 | 2.81 | 3.03 | 3.09 | 2.22 |
| α($CO_2/N_2$) | 19.9 | 35.67 | 14.16 | 9.68 | 17.94 |

TABLE 4

| Test items | Examples | |
|---|---|---|
| | 6 | 7 |
| Permeability P [$10^{-10}$ mol/(m² · s · Pa)] | | |
| P($N_2$) | 0.345 | 0.676 |
| P($CH_4$) | 0.491 | 1.2 |
| P($CO_2$) | 8.25 | 44.0 |
| Separating ratio α | | |
| α($CH_4/N_2$) | 1.42 | 1.78 |
| α($CO_2/N_2$) | 23.92 | 65.04 |

As is apparent from Tables 3 and 4, the separation membrane obtained in Examples 1 to 5, wherein tetraalkoxysilane is hydrolyzed to form polymer and then a hydrocarbon group-containing trialkoxysilane having a hydrocarbon group selected from the group consisting of an alkyl group 2 to 6 carbon atoms and a phenyl group is added, shows excellent affinity with methane and very high methane permeability ratio α($CH_4/N_2$).

The separation membranes obtained in Examples 6 and 7, wherein a hydrocarbon group-containing trialkoxysilane having a methyl group which is an alkyl group having one carbon atom is employed, show high carbon dioxide permeability ratio α($CO_2/N_2$), especially in Example 7. The membranes are suitable for separating carbon dioxide.

Example 8

This example confirmed a change of methane separation ratio wherein a molar ratio of tetraethoxysilane and hexyltriethoxysilane (tetraethoxysilane/hexyltriethoxysilane) of Example 4 was changed within a range of 0.9/0.1 to 0.1/0.9 (total 1 mol). Operation was generally conducted as described in Example 4, but a formulation amount of hexyltrimethoxysilane was increased by every 0.1 mol from 0.1 to 0.9 and a permeation ration α($CH_4/N_2$) of methane and nitrogen was determined. The results are shown in Table 5. In order to show its change clearly, a graph was prepared with permeation ratio α($CH_4/N_2$) being vertical axis and molar amount of hexyltriethoxysilane (He-TEOS) being horizontal axis. The graph is shown in FIG. 2.

TABLE 5

| He-TEOS mol number | Permeation ratio $CH_4/N_2$ |
|---|---|
| 0.1 | 2.35 |
| 0.2 | 2.68 |
| 0.3 | 3.20 |
| 0.4 | 3.00 |
| 0.5 | 3.20 |
| 0.6 | 3.80 |
| 0.7 | 4.13 |
| 0.8 | 4.65 |
| 0.9 | 4.90 |
| 1 | 2.60 |

Figure 2:
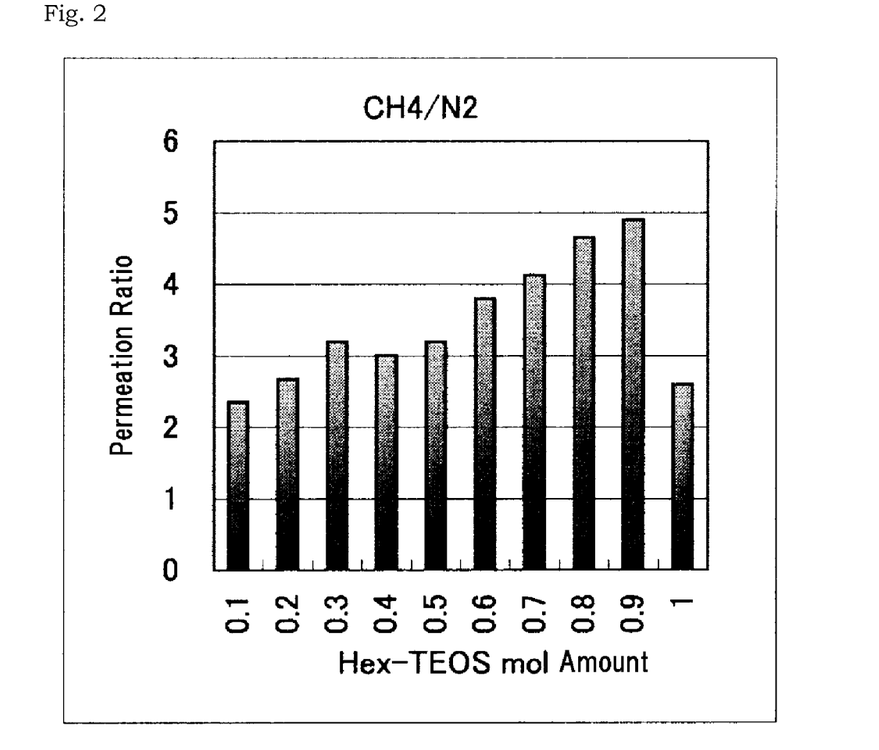
FIG. 2 is a graph with permeation ratio $\alpha(CH_4/N_2)$ being vertical axis and molar amount of hexyltriethoxysilane (He-TEOS) being horizontal axis.

As is shown in Table 5 and FIG. 2, permeation ratio α($CH_4/N_2$) is increased as mol number of hexyltriethoxysilane is increased. The results show that mol ratios of tetraethoxysilane/hexyltriethoxysilane are preferred in a range of 0.3/0.7 to 0.1/0.9 (i.e. 3/7 to 1/9).

Example 9

This example confirmed a change of carbon dioxide separation ratio α wherein a molar ratio of tetraethoxysilane and methyltriethoxysilane (tetraethoxysilane/methyltriethoxysilane) of Examples 6 and 7 was changed within a range of 0.9/0.1 to 0.1/0.9 (total 1 mol). Operation was generally conducted as described in Examples 6 and 7, but a formulation amount of methyltrimethoxysilane was increased by every 0.1 mol from 0.1 to 0.9 and a permeation ration α($CH_4/N_2$) of carbon dioxide and nitrogen was determined. The results are shown in Table 6. In order to show its change clearly, a graph was prepared with permeation ratio α($CO_2/N_2$) being vertical axis and molar amount of methyltriethoxysilane (Me-TEOS) being horizontal axis. The graph is shown in FIG. 3.

TABLE 6

| Me-TEOS mol number | Permeation ratio $CO_2/N_2$ |
|---|---|
| 0.1 | 23.9 |
| 0.2 | 35.3 |
| 0.3 | 57.1 |
| 0.4 | 68.8 |
| 0.5 | 66.1 |
| 0.6 | 81.7 |
| 0.7 | 58.0 |
| 0.8 | 46.5 |
| 0.9 | 43.8 |

Figure 3:
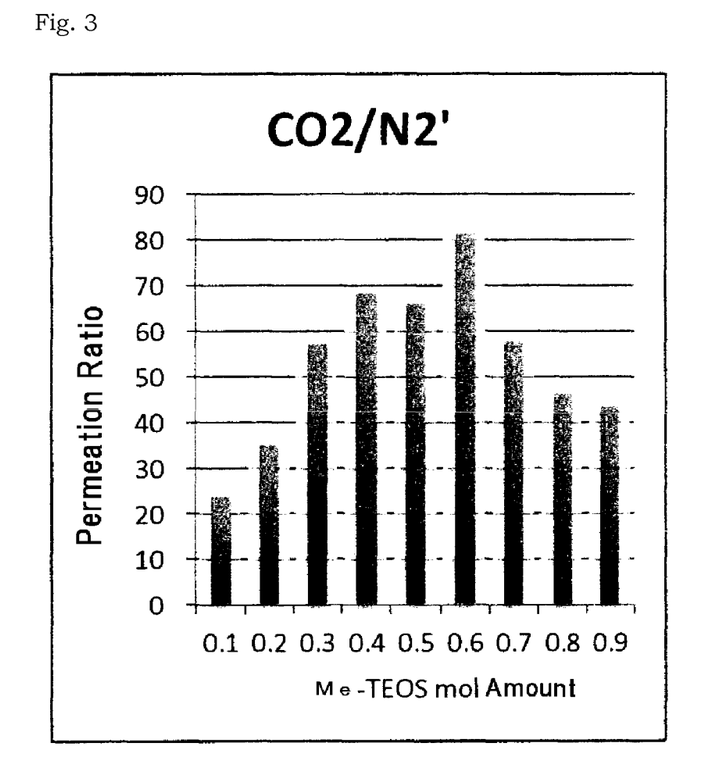
FIG. 3 is a graph with permeation ratio $\alpha(CO_2/N_2)$ being vertical axis and molar amount of methyltriethoxysilane (Me-TEOS) being horizontal axis.

As is shown in Table 6 and FIG. 3, permeation ratio α($CO_2/N_2$) is increased as mol number of methyltriethoxysilane is increased, but it is decreased when the mol number is over 0.5 to 0.7. The results show that mol ratios of tetraethoxysilane/hexyltriethoxysilane are preferred in a range of 0.7/0.3 to 0.3/0.7 (i.e. 7/3 to 3/7).

Example 10

This example confirmed a change of carbon dioxide and methane permeability ratio α ($CO_2/CH_4$) according to an amount of methyltriethoxysilane, based on the date of Example 9. The results are shown in Table 6. In order to show its change clearly, a graph was prepared with permeation ratio α($CO_2/CH_4$) being vertical axis and molar amount of methyltriethoxysilane (Me-TEOS) being horizontal axis. The graph is shown in FIG. 4.

TABLE 7

| Me-TEOS mol number | Permeation ratio $CO_2/CH_4$ |
|---|---|
| 0.1 | 16.80 |
| 0.2 | 25.60 |
| 0.3 | 53.30 |
| 0.4 | 94.94 |
| 0.5 | 51.12 |
| 0.6 | 35.30 |
| 0.7 | 28.30 |
| 0.4 | 15.00 |
| 0.9 | 15.00 |

Figure 4:
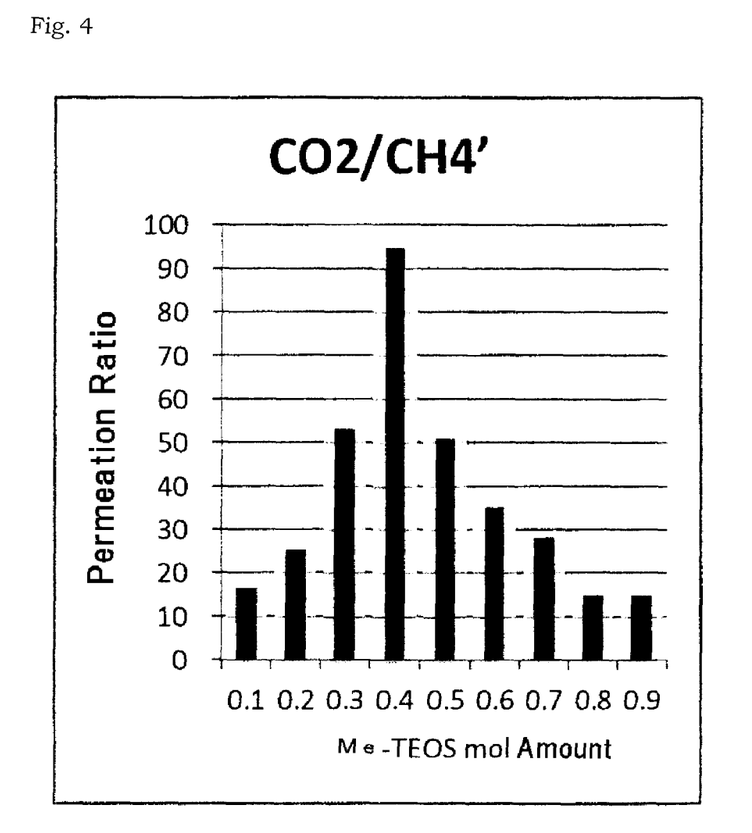
FIG. 4 is a graph with permeation ratio $\alpha(CO_2/CH_4)$ being vertical axis and molar amount of methyltriethoxysilane (Me-TEOS) being horizontal axis.

As is shown in Table 7 and FIG. 4, permeation ratio $\alpha(CO_2/CH_4)$ is specifically changed as mol number of methyltriethoxysilane is increased. Especially, when an amount of methyltriethoxysilane is within the range of 0.3 to 0.5, permeation ratio $\alpha(CO_2/CH_4)$ is very high. The results show that mol ratios of tetraethoxysilane/mexyltriethoxysilane are preferred in a range of 0.7/0.3 to 0.5/0.5 (i.e. 7/3 to 5/5).

REFERENCE SIGNS LIST

1: Gas cylinder
2: Pressure gage
3: Gas permeability test apparatus
4: Separation membrane
5: Mass flow meter
6: Sealing agent (epoxy resin)

What is claimed is:

1. A process for producing a membrane for separating carbon dioxide, which comprises the following steps:
   (a) preparing a metal alkoxide solution by (i) mixing an acid catalyst, water and an organic solvent, (ii) adding thereto tetraalkoxysilane and mixing at a temperature of 15 to 40° C., and (iii) then adding thereto a methyltrialkoxysilane, and mixing at a temperature of 15 to 40° C.,
   (b) applying the metal alkoxide solution on an inorganic porous support, and then
   (c) calcining the inorganic porous support having metal alkoxide solution layer at a temperature of 30 to 300° C.

2. The process according to claim 1 wherein
   the acid catalyst is selected from the group consisting of nitric acid and hydrochloric acid, the organic solvent is selected from alcohols consisting of methanol, ethanol and propanol,
   the tetraalkoxysilane is selected from the group consisting of tetramethoxysilane and tetraethoxysilane, and
   the methyltrialkoxysilane is selected from the group consisting of methyltrimethoxysilane and methyltriethoxysilane.

3. The process according to claim 1 wherein the step (a-i) is conducted at a temperature of 15 to 40° C. for 0.5 to 3 hours,
   the step (a-ii) is conducted at a temperature of 15 to 40° C. for 0.5 to 24 hours,
   the step (a-iii) is conducted at a temperature of 15 to 40° C. for 0.5 to 24 hours,
   the step (b) comprises (b-i) immersing the inorganic porous support in the metal alkoxide solution, (b-ii) drying by allowing it to stand at a temperature of 15 to 40° C. for 0.5 to 3 hours and (b-iii) repeating the steps (b-i) to (b-ii) until the inorganic porous support is uniformly coated,
   the step (c) comprises (c-i) elevating temperature from room temperature to a calcining temperature of 30 to 300° C. for 1 to 24 hours, (c-ii) keeping at the calcining temperature for 0.5 to 6 hours, (c-iii) cooling from the calcining temperature to room temperature for 5 to 10 hours, and then step (b) and step (c) are repeated once to 10 times.

4. The process according to claim 1 wherein the metal alkoxide solution contains 0.005 to 0.1 mol of the acid catalyst, 0.5 to 10 mol of water and 5 to 60 mol of the organic solvent, based on 1 mol of the combination of tetraalkoxysilane and methyltrialkoxysilane, and a molar ratio of tetraalkoxysilane/methyltrialkoxysilane is 9/1 to 1/9.

5. The process according to claim 1 wherein the carbon dioxide-separating membrane has a permeability ratio $[\alpha(CH_4/N_2)]$ of methane permeability $P(CH_4)$/nitrogen permeability $P(N_2)$ of 1 to 10 and a permeability ratio $[\alpha(CO_2/N_2)]$ of carbon dioxide permeability $P(CO_2)$/nitrogen permeability $P(N_2)$ of 1 to 100.

6. The process according to claim 1 wherein the permeation ratio $[\alpha(CO_2/N_2)]$ of carbon dioxide permeability $P(CO_2)$/nitrogen permeability $P(N_2)$ is maximum when a molar ratio of tetraalkoxysilane/methyltrialkoxysilane is 7/3 to 3/7.

* * * * *